US012685309B2

(12) United States Patent
Sowa et al.

(10) Patent No.: US 12,685,309 B2
(45) Date of Patent: Jul. 21, 2026

(54) AGROCHEMICAL FORMULATIONS

(71) Applicant: BASF CORPORATION, Florham Park, NJ (US)

(72) Inventors: Christian Sowa, Limburgerhof (DE); Klaus Kolb, Limburgerhof (DE); Michael Krapp, Limburgerhof (DE); Wolfgang Meier, Limburgerhof (DE); Steven Joseph Bowe, Research Triangle Park, NC (US); Sanjeev Kumar Bangarwa, Research Triangle Park, NC (US); Matthias Bratz, Limburgerhof (DE); Anja Simon, Limburgerhof (DE); Claude Taranta, Limburgerhof (DE); Marc Nolte, Limburgerhof (DE)

(73) Assignee: BASF CORPORATION, Florham Park, NJ (US)

( * ) Notice: Subject to any disclaimer, the term of this patent is extended or adjusted under 35 U.S.C. 154(b) by 722 days.

(21) Appl. No.: 17/914,877

(22) PCT Filed: Mar. 31, 2020

(86) PCT No.: PCT/US2020/025889
§ 371 (c)(1),
(2) Date: Sep. 27, 2022

(87) PCT Pub. No.: WO2021/201838
PCT Pub. Date: Oct. 7, 2021

(65) Prior Publication Data
US 2023/0145432 A1    May 11, 2023

(51) Int. Cl.
*A01N 37/40* (2006.01)
*A01N 25/30* (2006.01)
*A01P 13/00* (2006.01)

(52) U.S. Cl.
CPC ............. *A01N 37/40* (2013.01); *A01N 25/30* (2013.01); *A01P 13/00* (2021.08)

(58) Field of Classification Search
CPC .......... A01N 37/40; A01N 25/30; A01P 13/00
See application file for complete search history.

(56) References Cited

U.S. PATENT DOCUMENTS

| | | | | |
|---|---|---|---|---|
| 2012/0149572 A1* | 6/2012 | Gewehr | ................. | A01N 43/40 504/324 |
| 2012/0302444 A1* | 11/2012 | Kolb | ...................... | A01N 43/54 504/243 |
| 2015/0157012 A1* | 6/2015 | Schnabel | ............... | A01N 59/04 504/324 |

FOREIGN PATENT DOCUMENTS

| | | |
|---|---|---|
| CN | 102770160 A | 11/2012 |
| CN | 106857615 A | 6/2017 |
| CN | 109497079 A | 3/2019 |
| CN | 111034738 A | 4/2020 |
| DE | 3122073 A1 * | 3/1982 |
| EP | 0909530 A1 | 4/1999 |
| WO | WO-2010102102 A1 | 9/2010 |
| WO | WO-2014/006047 A1 | 1/2014 |

OTHER PUBLICATIONS

DE3122073A1—machine translation. Richter, S. "Method for Producing High-Percent Dicamba" (Year: 1982).*
DE3122073A1—machine translation. Richter, Sidney. "Method for Producing High-Percent Dicamba" 1982 (Year: 1982).*
"Re-evaluation decision RVD2008-28—Dicamba", retrieved from the Internet at: <http://pesticidetruths.com/wp-content/uploads/2013/06/Health-Canada-dicamba-2008-08-05-Re-Evaluation-Decision-RVD2008-28.pdf> (Aug. 2008).
Baron et al., Dicamba section, pp. 300-304, IN: Identification of Toxic Impurities in Technical Grades of Pesticides Designated as Substitute Chemicals, Health Effects Research Laboratory, Environmental Protection Agency (May 1978).
European Search Report for EP Patent Application No. 19166668.4, Issued on May 22, 2019, 4 pages.
International Application No. PCT/US2020/025889, International Search Report and Written Opinion, mailed Dec. 15, 2020.

* cited by examiner

*Primary Examiner* — Sean M Basquill
*Assistant Examiner* — Rajan Pragani
(74) *Attorney, Agent, or Firm* — MARSHALL, GERSTEIN & BORUN LLP

(57) ABSTRACT

Agrochemical aqueous formulations comprising A) An agriculturally acceptable salt of dicamba, B) At least one anionic surfactant that comprises at least one naphthalene sulfonate C) an aqueous solvent, D) Optionally at least one thickener, E) Optionally other pesticides, F) Optionally other formulation auxiliaries.

13 Claims, No Drawings

AGROCHEMICAL FORMULATIONS

CROSS-REFERENCE TO RELATED APPLICATIONS

This is the U.S. national phase of International Application No. PCT/US2020/025889, filed Mar. 13, 2020.

The present invention relates to agrochemical aqueous formulations comprising

A) An agriculturally acceptable salt of dicamba,

B) At least one naphthalene sulfonate,

C) an aqueous solvent,

D) Optionally at least one thickener,

E) Optionally other pesticides,

F) Optionally other formulation auxiliaries.

The present invention further relates to methods for making such agrochemical formulations and to methods of controlling undesired vegetation using such agrochemical formulations.

Dicamba is a widely used and commercially successful herbicide. It is desirable to find formulations that can be admixed to glyphosate and/or glufosinate, their salts—particularly preferably the ammonium, diammonium, iso-propyl ammonium and potassium salt of glyphosate—and their formulations. It is further desirable to find formulations in which the mixture partner, i.e. another pesticidal active ingredient, is not water soluble and the resulting formulation is a suspension concentrate of the dissolved dicamba salt and the suspended and milled co-active. Such actives can be e.g. Pyroxasulfone, DMTA-P or Saflufenacil. Such pesticidal coformulations comprising dicamba and glyphosate and/or glufosinate should be physically and chemically stable, display low vapor pressure, have a good biological activity, and are safe to handle during application. Finally, it is desirable to reduce the volume of organic solvents that are applied in agrochemical formulations. It is thus desirable to find aqueous-based formulations of dicamba, which are cheaper, require less adjuvants, are safer in application, and containing a lower content of organic solvents.

It was an objective of the present invention to find an aqueous-based formulation of dicamba with a good biological effectivity. It was also an objective of the invention to find a dicamba formulation that can be mixed with glyphosate and/or glufosinate, their salts and formulations to create pesticidal mixtures that have a good biological effectivity, and are physically and chemically stable and show no phase separation or sedimentation.

The objectives have been achieved by agrochemical aqueous formulations comprising A) An agriculturally acceptable salt of dicamba, B) At least one naphthalene sulfonate, C) an aqueous solvent, D) Optionally at least one thickener, E) Optionally other pesticides, F) Optionally other formulation auxiliaries.

Dicamba is 3,6-dichloro-2-methoxybenzoic acid. In agrochemical formulations, agriculturally acceptable salt of dicamba are used. When reference is made herein to "dicamba" as a component of an agrochemical formulations, this shall be meant to be understood as "an agriculturally acceptable salt of dicamba". Such agriculturally acceptable salts of dicamba are obtained by neutralization of the carboxylic acid groups of the dicamba molecule and comprise counterions. Agriculturally acceptable salts of dicamba include those comprising one or more of the following cationic counterions: potassium, sodium, ammonium ($NH_4^+$), N,N-Bis-(3-aminopropyl)methylammonium (BAPMA), monoethanolammonium, diglycomammonium, dimethylammonium (DMA), Preferably, said agriculturally acceptable salt of dicamba comprises potassium, BAPMA or DGA as counterions. All contents of dicamba, its salts of or side components and their salts referred to herein are to be understood as being calculated as free dicamba (and not the corresponding salts).

Especially preferably, said agriculturally acceptable salt of dicamba comprises potassium counterions.

In one preferred embodiment, the agrochemical composition comprises dicamba-K (the potassium salt of dicamba). Dicamba-K is commercially available. It can be prepared by reaction of the free acid form of dicamba with KOH. Dicamba-K typically refers to a 1:1 salt of the dicamba anion and potassium.

In one embodiment, the dicamba used comprises up to 15 wt %, for example 3 to 15 wt % or 5 to 15 wt %, of 3,5-dichloro-2-methoxybenzoic acid, 3,5-dichloro-2-hydroxybenzoic acid and/or 3,6-dichloro-2-hydroxybenzoic acid, with such percentages being based on the cumulative amount of dicamba and the listed components, in each case calculated as free dicamba (and not as a salt). The amount of up to 15 wt %, for example 3 to 15 wt % or 5 to 15 wt % shall mean the amount of the sum of the contents of the three named compounds (herein also referred to as "side components").

As it turned out, the presence of such side components in higher amounts may at high concentrations of dicamba and optionally other pesticides lead to formulations that contain considerable amounts of undissolved components. A "high concentration" of dicamba can for example mean a concentration of 250 g/l or above, of 300 g/l or above, of 400 g/l or above or 500 g/l or above. Such undissolved components may lead to phase separation, formation of serum or sedimentation and may lead to problems when applying the formulated product. It was therefore an objective to find a stable formulations of dicamba containing such side components.

When reference is made herein to "dicamba", this shall include the mixture of dicamba with such side components, if applicable.

Typically, agriculturally acceptable salts of dicamba are comprised in the formulation in amounts of 20 to 720 g/l, preferably 100 to 720 g/l or 100 to 700 g/l.

In one embodiment, agriculturally acceptable salts of dicamba are comprised in the formulation in amounts of 20 to 350 g/l or 50 to 200 g/l.

In one embodiment, agriculturally acceptable salts of dicamba are comprised in the formulation in amounts of 300 to 550 g/l or 400 to 700 g/l.

The dicamba salt is at least partly dissolved in the aqueous solvent at room temperature. Preferably, all of the dicamba salt present is dissolved in the aqueous solvent at room temperature.

Preferably, formulations according to the invention are soluble liquid concentrate formulations ("SL formulations") with respect to the dicamba.

Formulations according to the invention further comprise at least one naphthalene sulfonate.

The term one naphthalene sulfonate shall include mono naphthalene sulfonates as well as condensation products of naphthalene sulfonates with formaldehyde. In each case, the naphthalene moieties may contain further substituents such as alkyl groups on the aromatic moiety.

In one embodiment said naphthalene sulfonate is 1-naphthalene sulfonate, 2-naphthalene sulfonate or a mixture thereof.

In one embodiment, said naphthalene sulfonate is the condensation product of a naphthalene sulfonate with formaldehyde.

In one embodiment, said condensation product of a naphthalene sulfonate with formaldehyde comprises a number average of 1.5 to 10, preferably 2 to 3 naphthalene moieties per molecule.

Typically, naphthalene sulfonates are comprised in the formulation in amounts of 5 to 50 g/l.

Formulations according to the invention comprise an aqueous solvent.

An aqueous solvent in this context shall mean water or a solvent system comprising at least 50 wt %, preferably 79 wt %, more preferably 90 wt %, especially 95 wt % and particularly at least 99 wt % of water, in each case based on the solvent system.

In one preferred embodiment, the aqueous solvent is water.

Formulations according to the invention may optionally comprise a thickener.

In one embodiment, Formulations according to the invention comprise no thickener.

In one embodiment, Formulations according to the invention comprise at least one thickener.

Preferably, formulations according to the invention comprise at least one inorganic clay as a thickener, such as bentonite, smectite, kaolinic clay.

Especially preferably, the thickener includes smectite, particularly activated smectite. "Activated smectite" means that agglomerated smectite particles are being deagglomerated by grinding.

Typically, such inorganic thickener is comprised in said formulation in an amount of 1 to 50 g/l.

In one embodiment, Formulations according to the invention comprise at least one further pesticide. Such further pesticides are especially herbicides.

Such further pesticides, especially herbicides, can be present in dissolved form or in particulate form or in encapsulated form.

Examples of preferred further pesticides include Pyroxasulfone, Dimethenamid-P and Saflufenacil, glyphosate and/or glufosinate or their agriculturally acceptable salts. In one embodiment, examples of preferred further pesticides include Pyroxasulfone, Dimethenamid-P and Saflufenacil.

Further pesticides are normally comprised in formulations according to the invention in amounts of up to 720 g/l. Typically, the combined amount of dicamba and further pesticides in formulations according to the invention is 20 to 720 g/l, preferably 100 to 700 g/l.

In one embodiment, Formulations according to the invention comprise at least one further auxiliary.

Suitable further auxiliaries include solvents, liquid carriers, solid carriers or fillers, surfactants, dispersants, emulsifiers, wetters, adjuvants, solubilizers, penetration enhancers, protective colloids, adhesion agents, humectants, repellents, attractants, feeding stimulants, compatibilizers, bactericides, anti-freezing agents, anti-foaming agents, colorants, tackifiers and binders.

Typically, formulations according to the invention do not comprise more than 250 g/l of further formulation auxiliaries.

Suitable solid carriers or fillers include mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nut-shell meal, and mixtures thereof.

Suitable surfactants include surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants different from anionic surfactants B) include alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, -sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants include alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpoly-glucosides. Examples of polymeric surfactants are home- or copolymers of vinylpyrrolidone, vinylalcohols, or vinylacetate.

Suitable cationic surfactants include quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or poly-acid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxiliaries. Further examples are listed by Knowles, Adjuvants and additives, Ag row Reports DS256, T&F Informa UK, 2006, chapter 5.

Suitable bactericides include bronopol and isothiazolinone derivatives such as alkylisothiazolinones and benzisothiazolinones.

Suitable anti-freezing agents include ethylene glycol, propylene glycol, urea and glycerin.

Suitable anti-foaming agents include silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders include polyvinylpyrrolidones, polyvinylacetates, poly-vinyl alcohols, polyacrylates, biological or synthetic waxes, and cellulose ethers.

Preferably, suitable further auxiliaries include solvents, surfactants, bactericides, anti-freezing agents, anti-foaming agents and/or colorants.

Formulations according to the invention are especially advantageous, if such formulations further comprise as component A2) a cumulative amount 3 to 15 wt % or 5 to 15 wt % of 3,5-dichloro-2-methoxybenzoic acid, 3,6-dichloro-2-hydroxybenzoic acid and/or 3,6-dichloro-2-hydroxybenzoic acid, based on the cumulative amount of dicamba and component A2.

"Cumulative amount" shall mean the combined amount of the side components. It turned out that formulations according to the invention are surprisingly stable even if side products or impurities are present in the formulations.

Some preferred embodiments of the invention are formulations with the following composition:

Agrochemical formulation comprising
A) 250 to 720 g/l of an agriculturally acceptable salt of dicamba,
B) 0.5 to 200 g/l of at least one naphthalene sulfonate,
C) an aqueous solvent,
D) 1 to 50 g/l of at least one inorganic thickener.

Agrochemical formulation comprising
A) 250 to 720 g/l of an agriculturally acceptable salt of dicamba,
B) 0.5 to 200 g/l of at least one naphthalene sulfonate,
C) an aqueous solvent,
D) 1 to 50 g/l of at least one inorganic thickener.
E) 0-300 g/l of at least one other pesticide, especially herbicide,
F) Optionally other formulation auxiliaries.

Agrochemical formulation comprising
A) 250 to 720 g/l of an agriculturally acceptable salt of dicamba,
A2) 3 to 15 wt % or 5 to 15wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid,
B) 0.5 to 200 g/l of a condensate of naphthalene sulfonate and formaldehyde,
C) an aqueous solvent,
D) 1 to 50 g/l of an inorganic thickener, preferably a smectite clay,
E) 0-300 g/l of at least one other pesticide, especially herbicide,
F) Optionally other formulation auxiliaries.

Agrochemical formulation comprising
A) 250 to 720 g/l of an agriculturally acceptable salt of dicamba,
A2) 3 to 15 wt % or 5 to 15 wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid,
B) 0.5 to 200 g/l of a condensate of naphthalene sulfonate and formaldehyde,
C) an aqueous solvent,
D) 1 to 50 g/l of an inorganic thickener, preferably a smectite clay,
E) 0-300 g/l of at least one other pesticide, especially herbicide,
F) 0-100 g/l other formulation auxiliaries, wherein the total amount of pesticide in the formulation is below 800 g/l.

Agrochemical formulation comprising
A) 250 to 720 g/l of an agriculturally acceptable salt of dicamba,
A2) 3 to 15 wt % or 5 to 15 wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid,
B) 0.5 to 200 g/l of a condensate of naphthalene sulfonate and formaldehyde,
C) an aqueous solvent,
D) 1 to 50 g/l of an inorganic thickener, preferably a smectite clay,
E) 0-300 g/l of at least one other pesticide, especially herbicide,
F) 0-100 g/l of other formulation auxiliaries,
wherein the total amount of pesticide in the formulation is below 800 g/l.

Agrochemical formulation comprising
A) 250 to 720 g/l of an agriculturally acceptable salt of dicamba,
A2) 3 to 15 wt % or 5 to 15 wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid,
B) 0.5 to 200 g/l of a condensate of naphthalene sulfonate and formaldehyde,
C) water,
D) 1 to 50 g/l of a smectite clay,
E) 20 to 300 g/l of another herbicide selected from include Pyroxasulfone, Di-methenamid-P and Saflufenacil
F) 0 to 100 g/l of other formulation auxiliaries,
wherein the total amount of pesticide in the formulation is below 800 g/l.

Another aspect of the present invention are processes for making formulations according to the invention, comprising the following steps:

a) Dissolving the free acid of dicamba in an aqueous solvent
b) Neutralizing the acid, for example with 0.95 to 1.1 equivalents of a suitable base,
c) Adding of at least one anionic surfactant that comprises at least one naphthalene sulfonate under stirring.
d) Adding of a thickener premix, especially a premix of smectite activated smectite clay premix under stirring.
e) Addition of a premix of another herbicide, Addition of further thickener, biocide, antifoam agents as needed.

The order in which these steps are carried out may vary.

A premix of a thickener such as an (activated) smectite means a suspension comprising 20 to 80 g/l of such thickener in an aqueous solvent.

A premix of such further herbicide means a concentrated suspension of adequately fine milled particles, a solution of another herbicide in an aqueous solvent or any other water miscible solvent or a suspension of such further herbicide.

Another aspect of the present invention is the use of formulations according to the invention for controlling undesired vegetation.

Another aspect of the present invention are methods of controlling undesired vegetation, which comprises applying of formulations according to the invention, in diluted or undiluted form, to plants, their environment and/or on seeds.

The present invention offers the following advantages:

Formulations according to the invention are easy and economical to make.

Formulations according to the invention have a long shelf life and are storage stable, even in the presence of impurities, especially impurities with a lower solubility in water than dicamba. They are easy to homogenize and easy to mix with other formulations and easy to dilute with water.

Formulations according to the invention allow for the formulation of dicamba even if the dicamba contains significant amounts of impurities. Also, formulations according to the invention can easily be blended with dicamba or dicamba formulations containing side products or impurities.

Formulations according to the invention show lower or decreased vapor pressure.

Formulations according to the invention can be stored over long periods of time with little or no sedimentation.

EXAMPLES

Surfactant A: condensation product of a naphthalene sulfonate with formaldehyde comprises a number average 2 to 3 naphthalene moieties per molecule K-Dicamba: potassium dicamba with a purity of 93.8 wt % (calculated as dicamba potassium), with 3,5-dichloro-2-methoxybenzoic acid, 3,5-dichloro-2-hydroxybenzoic acid and/or 3,6-dichloro-2-hydroxybenzoic acid being comprised in a cumulative amount of 5.5 to 6.2 wt % (based on the mixture of dicamba and side components).

Example 1: Preparation of a Mineral Thickener Premix 3746 g demineralized water were placed in a 6 L stainless steel beaker equipped with a toothed disk stirrer. The stirrer was set at 2000 rpm followed by addition of 8 g of a 20% solution of Benzisothiazolinone) and 6 g of a solution containing 2-methyl-2H-isothiazol-3-one, 5-chloro-2-methyl-4-isothiazolinon-3-one and 2-Bromo-2-nitropropan-1,3 diol. To this mixture 240 g of a derivative of a naturally occurring magnesium aluminium silicate thickener (Van Gel B) were added and stirring was continued for one hour at ambient temperature. The resulting suspension was then passed one single passage over a glass bead mill at 10 L/h with 075-1.0 mm glass beads at 2400 rpm. The resulting activated derivative of a naturally occurring magnesium aluminium silicate thickener (Van Gel B) suspension was ready to be further used.

Example 2: Preparation of a high loaded potassium Dicamba solution containing 600 g/l a.e. Dicamba In a stainless steel beaker equipped with a toothed disk stirrer, 377.8 g demineralized water, 3.9 g of a solution containing 2-methyl-2H-isothiazol-3-one, 5-chloro-2-methyl-4-isothiazolinon-3-one and 2-Bromo-2-nitropropan-1,3 diol, 5.2 g of a 20% w/w solution of Benzisothiazolinone and 15.0 g of Surfactant A were placed under stirring. After dissolution, 749.4 g of dry K-Dicamba were added. Stirring was continued at 20 to 25° C. for 15 Minutes at 2000 rpm. Then 166.7 g of activated 6% w/w slurry obtained according example 1 was added and the resulting mixture was stirred for another 30 minutes. Finally, 2 g of a 20% w/w silicone defoamer emulsion were added, stirred for another 1 minute and the whole slurry was passed over a 150 μm sieve and filled into a bottle.

Example 3: Preparation of a High Loaded Potassium Dicamba Solution Containing 720 g/l a.e. Dicamba In a stainless steel beaker equipped with a toothed disk stirrer, 267.9 g demineralized water, 3. -9 g of a solution containing 2-methyl-2H-isothiazol-3-one, 5-chloro-2-methyl-4-isothiazolinon-3-one and 2-Bromo-2-nitropropan-1,3 diol, 5.2 g of a 20% w/w solution of Benzisothiazolinone and 15.0 g of Surfactant A were placed under stirring. After dissolution, 899.3 g of dry K-Dicamba were added. Stirring was continued at 20 to 25° C. for 15 Minutes at 2000 rpm. Then 166.7 g of activated 6% w/w slurry obtained according to example 1 was added and the resulting mixture was stirred for another 30 minutes. The resulting suspension was treated with a Ultraturrax T18 for 1 minute at 16,000 rpm, then the suspension was transferred to a basket mill (lab dissolver Dispermat CV3-Plus, VMA Getzmann, Germany) where it was milled with 0.75-1.00 mm glass beads for 20 minutes at 3000 rpm. Then, 2 g of a 20% w/w silicone defoamer emulsion were added, stirred for another 1 minute and the whole slurry was passed over a 150 μm sieve and filled into a bottle.

Example 4: Preparation of a High Loaded Potassium Dicamba Solution Containing 720 g/l a.e. Dicamba In a stainless steel beaker equipped with a toothed disk stirrer, 262.9 g demineralized water, 3.9 g of a solution containing 2-methyl-2H-isothiazol-3-one, 5-chloro-2-methyl-4-isothiazolinon-3-one and 2-Bromo-2-nitropropan-1,3 diol, 5.2 g of a 20% w/w solution of Benzisothiazolinone and 20.0 g of a nonionic ethyleneoxide-propylene oxide block co-polymer dispersant were placed under stirring. After dissolution, 899.3 g of dry K-Dicamba were added. Stirring was continued at 20 to 25° C. for 15 Minutes at 2000 rpm. Then 166.7 g of activated 6% w/w slurry obtained according to example 1 was added and the resulting mixture was stirred for another 30 minutes. The resulting suspension was treated with a Ultraturrax T18 for 1 minute at 16,000 rpm, then the suspension was transferred to a basket mill (lab dissolver Dispermat CV3-Plus, VMA Getzmann, Germany) where it was milled with 0.75-1.00 mm glass beads for 20 minutes at 3000 rpm. Then, 2 g of a 20% w/w silicone defoamer emulsion were added, stirred for another 1 minute and the whole slurry was passed over a 150 μm sieve and filled into a bottle.

Example 5: Preparation of a High Loaded Potassium Dicamba Solution Containing 720 g/l a.e. Dicamba In a stainless steel beaker equipped with a toothed disk stirrer, 420.6 g demineralized water, 3.9 g of a solution containing 2-methyl-2H-isothiazol-3-one, 5-chlormethyl-4-isothiazolinon-3-one and 2-Bromo-2-nitropropan-1,3 diol, 5.2 g of a 20% w/w solution of Benzisothiazolinone and 15.0 g Surfactant A were placed under stirring. After dissolution, 899.3 g of a dry K-Dicamba were added. Stirring was continued at 20 to 25° C. for 15 Minutes at 2000 rpm. Then 14 g of a slurry of 2 g Xanthan gum thickener in a mixture of 10 g Propylene glycol and 2 g deionized water was added and the resulting mixture was stirred for another 30 minutes until the whole thickener premix got evenly distributed in the suspension. The resulting suspension was treated with a Ultraturrax T18 for 1 minute at 16,000 rpm, then the suspension was transferred to a basket mill (lab dissolver Dispermat CV3-Plus, VMA Getzmann, Germany) where it was milled with 0.75-1.00 mm glass beads for 20 minutes at 3000 rpm. Then, 2 g of a 20% w/w silicone defoamer emulsion were added, stirred for another 1 minute and the whole slurry was passed over a 150 μm sieve and filled into a bottle.

Example 6: Stability of Formulations

The samples obtained in Example 2 to 5 were stored at room temperature (22° C.+/−2° C.), 54° C., 50° C., 40° C. and under temperature cycling with 12 hour changes between +10° C. and −10° C. and +30° C. and −5° C. for 2 up to 8 weeks. The best examples, 2 and 3 gave only a small amount of serum formation and were, if necessary, easy to be redispersed.

| | Example 2 | Example 3 | Example 4 | Example 5 |
|---|---|---|---|---|
| Initial | ok | ok | ok | ok |
| 2 weeks 22° C | ok | ok | 22% serum | gelled |
| 2 weeks 54° C | 6% serum | 8% serum | >60% serum | gelled |
| 6 weeks 50° C | 4% serum | 8% serum | 50% serum | gelled |
| 8 weeks 40° C | 4% serum | 8% serum | 50% serum | gelled |
| 4 weeks + 10/−10° C | 6% serum | 8% serum | 25% serum | gelled |
| 4 weeks + 30/−5° C | 8% serum | 8% serum | 40% serum | gelled |

Example 7: Solubility of Dicamba 400 g of Dicamba with the 93.8 wt % purity as defined above in the experimental part were mixed with water and stirred to obtain a 400 g/l mixture of dicamba. A turbid mixture was obtained that contained optically visible undissolved components. Storage of the formulation at room temperature for two weeks led to serum formation and sedimentation of the undissolved components.

400 g of dicamba with a purity of 98 wt % were mixed with water. A clear solution was obtained.

The invention claimed is:

1. An agrochemical aqueous formulation comprising

A) at least 250 g/l of an agriculturally acceptable salt of dicamba,

A2) a cumulative amount 3 to 15 wt % of 3,5-dichloro-2-methoxybenzoic acid, 3,5-dichloro-2-hydroxybenzoic acid and/or 3,6-dichloro-2-hydroxybenzoic acid, based on the cumulative amount of dicamba and component A2, B) at least one anionic surfactant that comprises at least one naphthalene sulfonate, wherein said naphthalene sulfonate is a condensate of naphthalene sulfonate and wherein said condensate comprises a number average of 2 to 3 naphthalene moieties per molecule, C) an aqueous solvent, D) at least one thickener, wherein said thickener is a smectite clay, E) optionally other pesticides, and F) optionally other formulation auxiliaries.

2. The formulation according to claim 1, wherein said at least one naphthalene sulfonate is a condensate of naphthalene sulfonate and formaldehyde.

3. The formulation according to claim 1, wherein said naphthalene sulfonate is in the formulation in an amount of 0.5 to 200 g/l based on the formulation.

4. The formulation according to claim 1, wherein said agriculturally acceptable salt of dicamba comprises one or more counterions selected from the group consisting of sodium, potassium, BAPMA, DGA, and MPPA.

5. The formulation according to claim 1, wherein said agriculturally acceptable salt of dicamba is dicamba potassium.

6. The formulation according to claim 1, wherein said formulation comprises more than 300 g/l of said dicamba salt.

7. The formulation according to claim 1, comprising:

A) 250 to 720 g/l of the agriculturally acceptable salt of dicamba,

B) 0.5 to 200 g/l of the at least one naphthalene sulfonate,

C) the aqueous solvent, and

D) 1 to 50 g/l of the at least one thickener.

8. The formulation according to claim 1, comprising

A) 250 to 720 g/l of the agriculturally acceptable salt of dicamba,

A2) 3 to 15 wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid, B) 0.5 to 200 g/l of a condensate of naphthalene sulfonate and formaldehyde, C) the aqueous solvent, D) 1 to 50 g/l of the at least one thickener.

9. The formulation according to claim 1, comprising

A) 250 to 720 g/l of the agriculturally acceptable salt of dicamba,

A2) 3 to 15 wt %, based on the cumulative amount of dicamba and components A2, of 3,5-dichloro-2-methoxybenzoic acid, 3,5-dichloro-2-hydroxybenzoic acid and/or 3,6-dichloro-2-hydroxybenzoic acid, B) 0.5 to 200 g/l of a condensate of naphthalene sulfonate and formaldehyde, C) water, D) 1 to 50 g/l of the smectite clay, and E) 20 to 300 g/l of another herbicide which may be present in dissolved form or in particulate form or in encapsulated form, wherein a total amount of pesticide in the formulation is below 800 g/l.

10. The formulation according to claim 1, comprising 1 to 50 g/l of the smectite clay thickener.

11. The formulation according to claim 10, wherein the smectite clay is activated smectite.

12. A process for making a formulation according to claim 1, comprising:

a) dissolving the free acid of dicamba in an aqueous solvent b) neutralizing the acid, c) adding the at least one anionic surfactant that comprises at least one naphthalene sulfonate under stirring, d) adding a thickener premix under stirring, and e) adding a premix of another herbicide, adding a further thickener, biocide, antifoam agents as needed.

13. A method of controlling undesired vegetation, which comprises applying a formulation according to claim 1, in diluted or undiluted form, to plants, their environment, and/or on seeds.

* * * * *